(12) United States Patent
Yook et al.

(10) Patent No.: US 9,766,739 B2
(45) Date of Patent: Sep. 19, 2017

(54) METHOD AND APPARATUS FOR CONSTRUCTING A HOME SCREEN IN A TERMINAL HAVING A TOUCH SCREEN

(71) Applicant: Samsung Electronics Co., Ltd., Gyeonggi-do (KR)

(72) Inventors: Hyungmin Yook, Seoul (KR); Juneseok Kim, Seoul (KR); Sunyoung Yi, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 232 days.

(21) Appl. No.: 13/964,589

(22) Filed: Aug. 12, 2013

(65) Prior Publication Data

US 2014/0055388 A1 Feb. 27, 2014

(30) Foreign Application Priority Data

Aug. 22, 2012 (KR) .................. 10-2012-0091826

(51) Int. Cl.
  G06F 3/041 (2006.01)
  G06F 3/0488 (2013.01)
  G06F 3/0482 (2013.01)
  G06F 3/0481 (2013.01)

(52) U.S. Cl.
  CPC .......... *G06F 3/0416* (2013.01); *G06F 3/0482* (2013.01); *G06F 3/0488* (2013.01); *G06F 3/04817* (2013.01)

(58) Field of Classification Search
  None
  See application file for complete search history.

(56) References Cited

U.S. PATENT DOCUMENTS

| 5,767,852 A * | 6/1998 | Keller ................. G06F 3/04817 715/835 |
| 2005/0190971 A1* | 9/2005 | Brubacher-Cressman G06F 9/4446 382/209 |
| 2007/0022389 A1* | 1/2007 | Ording .................. G06F 3/0481 715/790 |

(Continued)

FOREIGN PATENT DOCUMENTS

| EP | 2 463 767 A2 | 6/2012 |
| KR | 10-2009-0023957 A | 3/2009 |

(Continued)

OTHER PUBLICATIONS

"Ergonomic requirements for office work with visual display terminals (VDTs)—Part 14: Menu dialogues"; 1997; First Edition; ISO 9241-14; Switzerland.

*Primary Examiner* — Seokyun Moon
(74) *Attorney, Agent, or Firm* — Cha & Reiter, LLC (57) ABSTRACT

A method of configuring a home screen in an electronic device includes displaying the home screen including one or more objects on the touch screen; detecting a first touch gesture requesting a display of a list function items related to the home screen in a state where the home screen is displayed; displaying the list of the function items in response to the first touch gesture for selection; detecting a second touch gesture selecting a specific function mode in a state where the list of the item is displayed; and displaying an editing screen on the touch screen for selection.

15 Claims, 4 Drawing Sheets

(56) References Cited

U.S. PATENT DOCUMENTS

| | | | | |
|---|---|---|---|---|
| 2007/0216965 | A1* | 9/2007 | Yoshihama | 358/474 |
| 2009/0178008 | A1* | 7/2009 | Herz et al. | 715/840 |
| 2010/0295789 | A1* | 11/2010 | Shin et al. | 345/168 |
| 2012/0071208 | A1* | 3/2012 | Lee et al. | 455/566 |

FOREIGN PATENT DOCUMENTS

| | | |
|---|---|---|
| KR | 10-0950123 B1 | 3/2010 |
| WO | 2009/096646 A1 | 8/2009 |

\* cited by examiner

METHOD AND APPARATUS FOR CONSTRUCTING A HOME SCREEN IN A TERMINAL HAVING A TOUCH SCREEN

CLAIM OF PRIORITY

This application claims the benefit under 35 U.S.C. §119 (a) of a Korean patent application filed on Aug. 22, 2012 in the Korean Intellectual Property Office and assigned Serial No. 10-2012-0091826, the entire disclosure of which is hereby incorporated by reference.

BACKGROUND

Field of the Invention

The present disclosure relates generally to a method and an apparatus for constructing a home screen, and more particularly, to a method and an apparatus for constructing a home screen in an electric device having a touch screen.

Description of the Related Art

With a recent development of a communication technology, a portable terminal, such as a smart phone and a tablet PC is used in a very wide range of fields. In particular, a portable terminal equipped with a touch screen provides various functions such as, for example, a video replay, data and text services. However, as the portable terminal provides more diverse functions, a user interaction for executing an individual menu and the user interaction becomes complex.

In the portable terminal equipped with the touch screen, an operation mode of the terminal may be changed to a screen configuration mode, that is, an editing mode, to configure a home screen. The editing mode changed from the home screen is divided into an editing mode for deleting and moving an icon and an editing mode for adding an icon. To this end, a user typically needs to select and long press an icon in order to move and delete an icon disposed on the home screen. In addition, in order to add an icon disposed on the home screen, the user needs to multi tab the home screen (for example, tabbing twice sequentially).

Thus, in order to enter into the editing mode for reconstructing the home screen, the user needs to inconveniently remember and perform each user interaction for an individual function. In addition, functions to configure the home screen such as creating a folder and adding a home page are introduced recently as more applications are added. Accordingly, there exists a need for a user interface for configuring the home screen in the portable terminal more quickly and easily.

SUMMARY

The present invention has been made in view of the above problems and provides additional advantages, by providing a method and an apparatus for configuring a home screen in which a list of a function item for guiding an entry into a screen configuration mode is displayed in a home screen through an interaction, instead of distinguishing interactions for each function in the home screen, such that a function item desired by a user is selected hierarchically to execute a function related to the home screen.

The present invention further provides an apparatus and a method for configuring a home screen in which an item list of functions related to a home screen is displayed by a touch gesture in the home screen and an item of a list is selected to change into a corresponding function mode, thereby configuring the home screen.

According to an aspect of the present invention, a method of configuring a home screen in a terminal comprising a touch includes: displaying the home screen including one or more objects on the touch screen; detecting a first touch gesture requesting a display of a list of selectable function modes related to the home screen; displaying the list of selectable function modes in response to the first touch gesture; detecting a second touch gesture selecting a particular function mode; and changing an operation mode of the terminal from a standby mode into the selected function mode in response to the second touch gesture, the selected function mode corresponding to an editing screen on the touch screen.

According to another aspect of the present invention, provided is a portable terminal including: a touch screen which provides a user interface; and a controller controlling the touch screen to display a home screen including one or more objects on the touch screen, detect a first touch gesture requesting a display of a list of selectable function modes related to the home screen, display the list of the selectable function modes in response to the first touch gesture, detect a second touch gesture selecting a particular function mode, and change an operation mode of the terminal from a standby mode into the selected function mode in response to the second touch gesture, and display an editing screen on the touch screen in response to the changed operation.

BRIEF DESCRIPTION OF THE DRAWINGS

The above features and advantages of the present invention will be more apparent from the following detailed description in conjunction with the accompanying drawings, in which.

DETAILED DESCRIPTION

Hereinafter, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In the present invention, the term "object" is an object related to executing a function of a terminal and means a function execution icon. In the present invention, an object may include an application execution icon and a widget execution icon.

In the present invention, a "home screen related function" is a function for editing a configuration of a home screen and may include an object adding function, an object moving and deleting function, an object folder creating function, a page adding function, and a BACKGROUND SCREEN setting function.

A method and an apparatus for configuring a home screen according to the present invention may apply to a portable terminal, which may include a portable phone, a smart phone, a tablet, a PC, a hand-held PC, a portable multimedia player (PMP), and a personal digital assistant (PDA).

Figure 1:
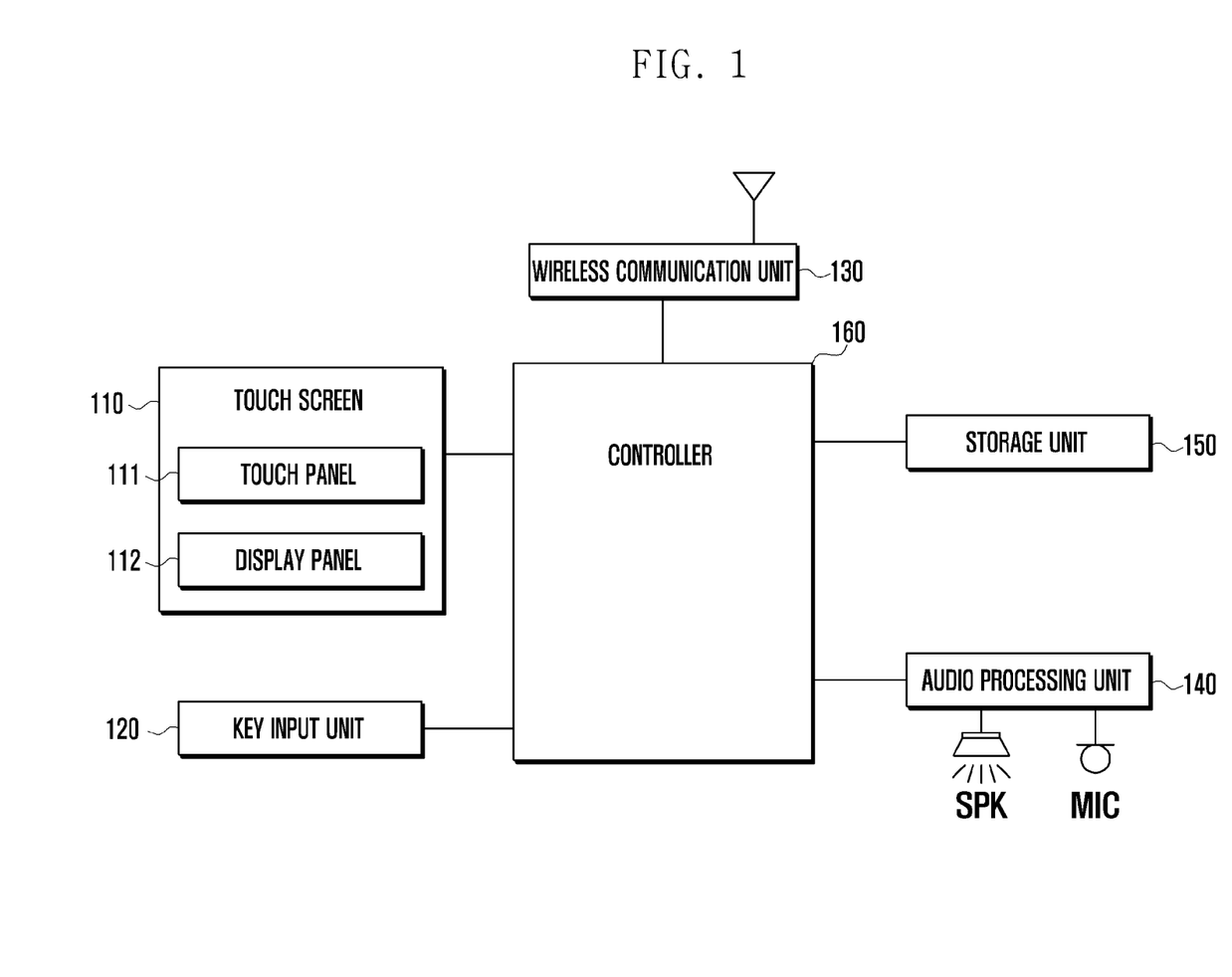
FIG. 1 is a view illustrating a configuration of a portable terminal according to an exemplary embodiment of the present invention.

FIG. 1 is a view illustrating a configuration of a portable terminal according to an exemplary embodiment of the present invention.

Referring to FIG. 1, a portable terminal 100 according to an exemplary embodiment of the present invention may include a touch screen 110, a key input unit 120, a storage unit 150, and a controller 160.

The touch screen 110 may be configured to include a touch panel 111 and a display panel 112. The touch panel 111 may be placed on the display unit, and includes a touch sensor to recognize a touched contact point and transmit a touch input signal to the controller 160. The touch panel 111 may be implemented as an add-on type which is located on the display panel 112 or an on-cell type or an in-cell type which is inserted into the touch panel 112.

Here, a user gesture is divided into a touch and a touch gesture. Further, the touch gesture may include a tab, a double tab, a long tab, a drag, a drag and drop, a flick, a press, etc. Here, the touch refers to an operation of a user to touch a certain point of a screen by using a touch input tool (for example, a finger or a stylus pen), the tab refers to a touch and release operation in which a certain point is touched and the touch input tool releases the touch from a corresponding point without movement of the touch input tool, the double tab refers to an operation of tabbing twice on a certain point sequentially, the long tab refers to an operation in which a touch is performed relatively longer than the tab and the touch input tool releases the touch at a corresponding point without movement of the touch input tool, the drag refers to an operation of moving the touch input tool in a predetermined direction in a state where a certain point is touched, the drag and drop refers to an operation in which the touch input tool release a touch after the drag, and the flick refers to an operation of releasing a touch as bouncing after moving the touch input tool relatively faster than the drag. The press refers to an operation of pressing a corresponding point after touching a certain point with the touch input tool. In order words, the touch refers to a state of contacting the touch screen 110, and the touch gesture refers to a movement of the touch from contacting (touch-on) the screen and releasing the touch (touch-off). A multi touch refers to a state in which the touch screen is contacted in various areas. The multi touch gesture refers to a touch movement of a multi touch in various areas from the touch and the release of the touch.

A capacitive type, a resistive type, an electromagnetic induction type, an infrared type, or an ultrasonic type may be applied to the touch panel 111.

The display panel 112 may display a screen related to an operation status of the portable terminal 100 and an operation being performed, under control of the controller 160. The display panel 112 provides various screens according to operations of the portable terminal 100, for example, a lock screen, a home screen, an application execution screen, a menu screen, and a keypad screen. The lock screen refers to a screen displayed when the screen of the touch panel is turned on. When a specific touch event for releasing the lock occurs, the controller 160 may convert an image being displayed from the lock screen into the home screen or the application execution screen. The home screen refers to a screen where icons of executing functions of the portable terminal and icons of executing applications are arranged and displayed. When one of the icons of executing applications displayed on the home screen is selected by the user under the control of the controller 160, the display panel 112 may execute the selected application and may display the executed screen. The controller 160 may execute a plurality of applications at the same time. The display panel 112 may display one of the execution screens under the control of the controller 160 even when a plurality of applications is executed at the same time. The display panel 112 may be formed in a flat display panel such as a liquid crystal display (LCD), an organic light emitted diode (OLED), and an active matrix organic light emitted diode (AMOLED).

When displaying a screen according to a character input mode, the display panel 112 may support a screen display by a horizontal mode or a vertical mode according to a rotational direction of the portable terminal 100 (or a direction in which the portable terminal 100 is placed) and an adaptive screen switching display according to the horizontal mode and the vertical mode.

The display panel 112 according to the present invention may display an item list of a function mode related to the home screen. Such item list may include, but not limited to, functional items for constructing the home screen such as moving and deleting an object, adding an object, creating a folder, adding a page, and setting a BACKGROUND SCREEN. The display panel 112 according to the present invention may display an item list as a pop up window on the home screen by setting the home screen as a background under the control of the controller 160. In the present invention, the display panel 112 may display editing screens for operating a function mode related to the home screen. Such editing screens may be divided into an editing screen for moving and deleting the object, an editing screen for adding the object, an editing screen for generating a folder on the home screen, an editing screen for adding the page, and an editing screen for changing BACKGROUND SCREEN settings.

The key input unit 120 may include a plurality of input keys and function keys for receiving number or character information and setting various functions. The function keys may include an arrow key, a side key, and a shortcut key set to perform a specific function. In addition, the key input unit 120 generates a key signal related to user setting and a function control of the portable terminal 100 to be transmitted to the controller 160. The key signal may be divided into a power on/off signal, a volume control signal, a screen on/off signal, etc. The controller 160 controls the above elements in response to the key signal. Also, when the touch screen 110 of the portable terminal 100 is supported in a full touch screen type, only at least one side key formed on a side of the portable terminal 100 may be included for turning on/off the screen and turning on/off the portable terminal.

A wireless communication unit 130 may perform a voice call, a video call, or a data communication between the portable terminal and a wireless communication system under the control of the controller 160. The wireless communication unit 130 may include a radio frequency transmission unit which performs up conversion and amplification on a frequency of a transmission signal, and a radio frequency receiving unit which performs low-noise amplification and down conversion on a frequency of a received signal. In addition, the wireless communication unit 130 may include a mobile communication module (for example, 3-generation mobile communication module, 3.5-generation mobile communication module or a 4-generation mobile communication module) and a digital broadcasting module (for example, a DMB module). An audio processing unit 140 may perform digital to analog conversion on an audio data such as a voice input from the controller 160 to be transmitted to a speaker SPK. The audio processing unit 140 may perform an analog to digital conversion on an audio data such as a voice input from a microphone (MIC) to be transmitted to the controller 160.

The storage unit 150 may store various data executed and processed in the portable terminal including an operating system and various applications of the portable terminal. The storage unit 150 may include a data area and a program area. The data area of the storage unit 150 may store data generated from the portable terminal according to the use of the portable terminal or downloaded from an external source and characteristic information representing a characteristic of such data. In addition, the data area may store the above described screens displayed by the display panel 112. Further, the data area may temporarily store data copied to be pasted. Also, the data area may store various setting values (for example, screen brightness, etc.) to operate the portable terminal.

The program area of the storage unit 150 may store an operating system (OS) for booting the portable terminal 100 or application programs needed for a call function, a video or music replay function, an image display function, or a camera photographing function under the control of the controller 160. In addition, the program area may store application program needed for a broadcast viewing function, an audio recording function, a calculator function, and a schedule management function.

The storage unit 150 in the present invention may store an input gesture such as a touch gesture and may store function information corresponding to each input gesture. The gesture information and the function information corresponding thereto may be set as single or plural at a time according to a user setting or set at manufacturer of the portable terminal. In the present invention, when a long press gesture or a multi tab gesture is detected in a state where the home screen is displayed, an input gesture requesting a display of an item list of a function mode related to the home screen may be stored. In particular, when the long press gesture for an empty area where an object is not disposed or displayed on the home screen is detected, the input gesture requesting the display of the item list of the function mode related to the home screen may be stored.

The controller 160 controls an overall operation and a signal flow between internal elements of the portable terminal 100 and may perform a function of processing data. The controller 160 may control the battery to control a power supply between internal elements. In addition, the controller 160 may perform the applications stored in the program area. When at least one of the touch, the touch gesture, the multi touch, and the multi touch gesture is generated, the controller 160 may implement a function corresponding to thereto.

In the present invention, the controller 160 may control to display the item list of the function mode related to the home screen to be displayed on the touch screen when a long press gesture occurs on the home screen. Accordingly, the user may verify the functions in order to configure the home screen according to the display of the item list of the function mode related to the home screen. The controller 160 detects a touch corresponding to the item list and may determine that one of function modes is selected. The controller 160 changes an operational mode of the terminal from a standby mode to a selected function mode in response to the touch corresponding to the item list and may display, on the touch screen 110, the editing screen on the touch screen 110 to operate the corresponding function mode. Accordingly, the user may select an item of a desired function through the item list and may implement a plurality of functions related to configuring the home screen easily and intuitively.

With the convergence of digital devices, there may be many digital devices and modifications thereof, not listed in the application, and a portable terminal 100 of the present invention may further include elements not described above such as a sensor module for detecting information related to a location change of the portable terminal, a GPS module for measuring a location of the portable terminal 100, and a camera module. Also, it should be noted that a specific element of the portable terminal 100 of the present invention may be omitted from the above configuration or replaced with another element according to a form in which the portable terminal 100 is provided. Further, an input unit in the present invention may be a touch pad or a trackball other than a touch screen 110 and a key input unit 120 described above.

Figure 2:
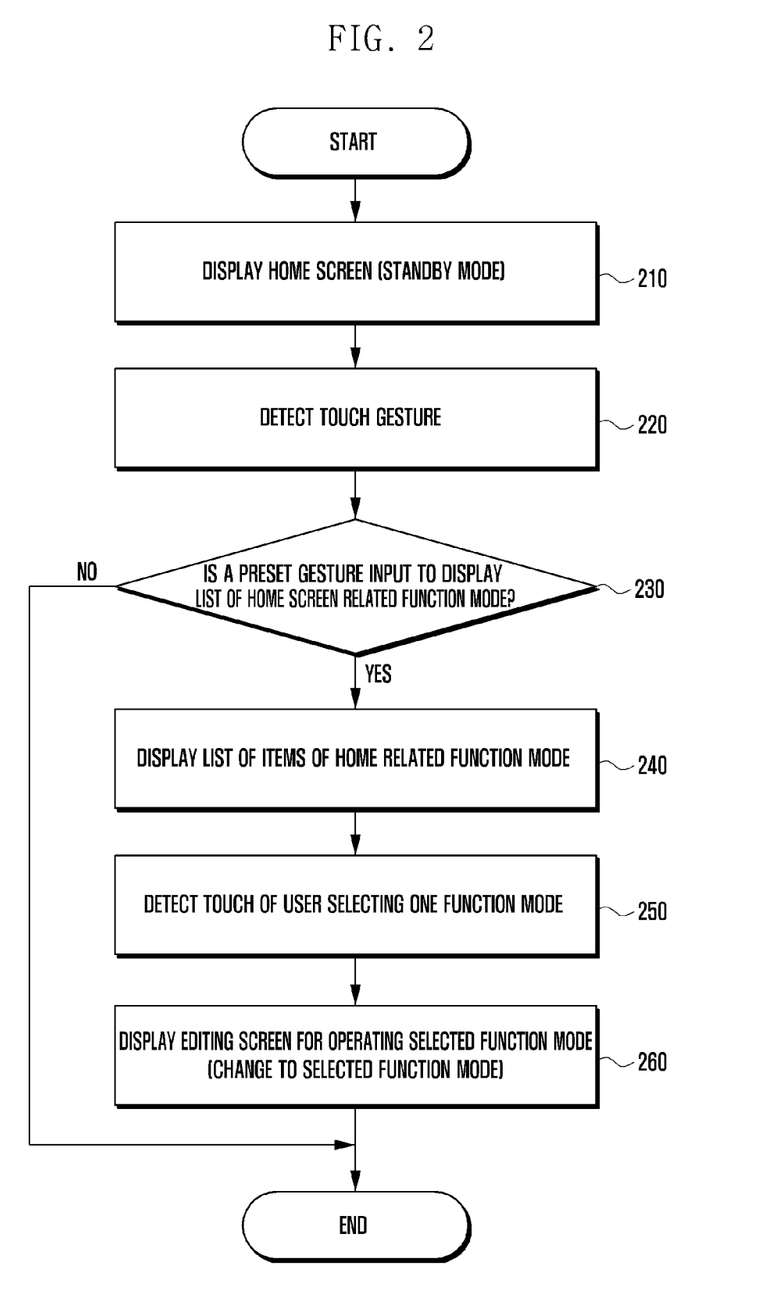
FIG. 2 is a flowchart for explaining a method of configuring a home screen according to an exemplary embodiment of the present invention.

A function of the controller 160 according to the present invention will be described in more detail below. FIG. 2 is a flowchart for explaining a method of configuring a home screen according to an exemplary embodiment of the present invention.

Referring to FIG. 2, the controller 160 may operate the standby mode (210). In the standby mode, the touch screen 110 may display the home screen in which one or more objects is included, under the control of the controller 160. Here, the object refers to an object which executes a function in the portable terminal such as an execution icon of an application installed within the portable terminal or an execution icon of a widget. The home screen refers to a screen where icons of executing functions of the portable terminal and icons of executing applications are arranged and displayed.

In the present invention, the controller 160 may provide a plurality of pages including at least one object according to an arrangement of the object on the touch screen 110. The controller 160 may control to be output one page screen on an entire of the home screen. Although, in the present invention, a case of displaying the home screen when the standby mode, is operated is described as an example, however, the present invention is not limited thereto and may correspond to a screen such as a menu screen where a plurality of objects is arranged.

The controller 160 may detect a touch gesture from the touch screen 110 in a state where the home screen is displayed (220). The controller 160 receives a touch input signal generated from the touch screen and may detect a touch position from the received touch input signal. For example, the controller 160 may calculate a coordinate of a touch contact point at the touch contact point and may verify a touch contact position through the calculated coordinate. Here, the touch gesture may be a touch gesture corresponding to an empty area in the home screen where the object is not disposed. For example, the controller 160 may verify if the user touch point is detected from an empty area where the object is not disposed or displayed by comparing touch contact position information and object disposition position information.

The controller 160 may determine whether the detected touch gesture is a preset gesture in order to "display a list of a function mode related to the home screen" (230). For example, the preset gesture may be a touch gesture which performs the long press on an empty area where the icon is not disposed or displayed on the home screen. The preset gesture may be defined by the user, may be defined at the time of manufacturing the portable terminal, and may be defined a different touch gesture such as the multi tab.

The controller 160 may determine whether a user touch contact time exceeds a preset threshold time in order to determine whether the long press touch gesture is detected. The preset threshold time may be defined by the user and may be defined at the time of manufacturing the portable terminal. For example, the controller 160 may set a case in which the touch contact time exceeds at least 500 ms.

The controller 160 may display the item list of a plurality of function modes related to the home screen on the touch screen 110 when the preset gesture for displaying the list of the function mode related to the home screen is detected (240). The item list is provided to enable the user to easily choose and select a function desired by the user among a plurality of function modes related to the home screen and to easily enter into the selected function mode.

The controller 160 may control the touch screen 110 to display the item list of the function mode related to the home screen by overlapping it or superimposing on the home screen. Alternatively, the controller 160 may control the touch screen 110 to display the item list of the function mode related to the home screen as a pop-up window. The item list includes a plurality of function items related to the home screen configuration, for example, but is not limited thereto, an icon movement and deletion item, an icon addition item, a page addition item, a BACKGROUND SCREEN setting item, etc.

The controller 160 may detect an input signal of the user to select one function mode in a state where the item list of the function mode is displayed (250). For example, in order to select one of the items displayed in the list, the user may enter an input, i.e., the user may touch or tab. The controller 160 may determine that one function mode is selected in response to the touch or the tab.

The controller 160 may display the editing screen in order to operate the function mode selected from the touch screen, when the functional item is selected in response to the user input (260). Here, the controller 160 may be changed to the function mode selected from the standby mode.

For example, the controller 160 may determine that the icon movement and the deletion function mode are selected in response to the user input signal. In this case, the operational mode of the controller 160 is changed to the editing mode for detecting the icon movement and deletion of the object. The controller 160 may display that icons disposed on the home screen are editable. In other words, the controller 160 may display the object displayed on the home screen as a vibration animation, which indicates that a graphic effect such as icons shaking or vibrating. The controller 160 may display a message to guide a change of the operational mode. The controller 160 may display that the operational mode has changed to the editing mode by changing a color of a BACKGROUND SCREEN or a screen layout.

Figure 3:
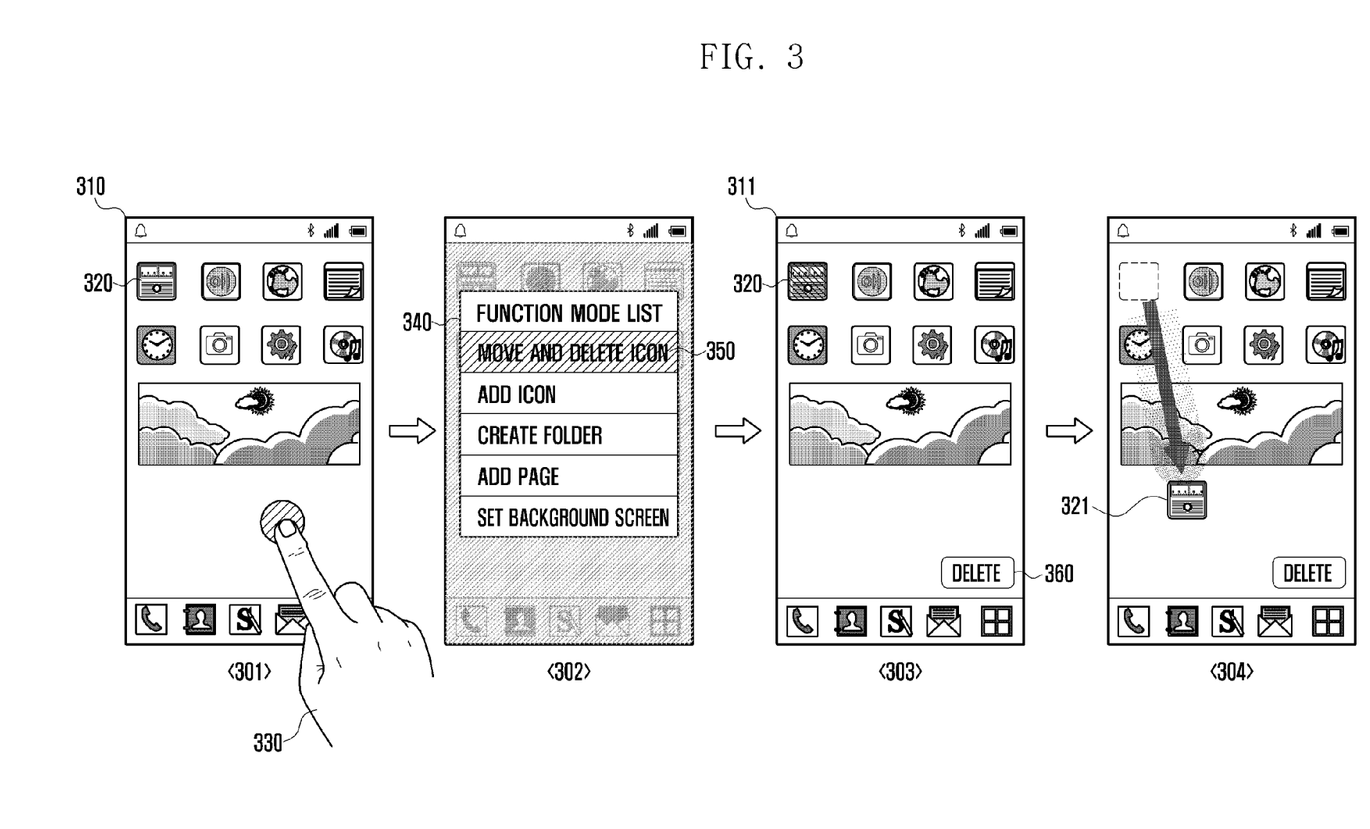
FIG. 3 is an example view illustrating a method of moving an object to configure a home screen according to an exemplary embodiment of the present invention.

FIG. 3 is an example view illustrating a method of moving an object to configure a home screen according to an exemplary embodiment of the present invention.

Referring to FIG. 3, the touch screen 100 may display the home screen 310 including one or more objects under the control of the controller 160, as illustrated in a screen 301 in FIG. 3. Here, the object may include icons 320 for executing functions and/or applications.

The user 330 may long press a portion of an open or empty area of the touch screen 110 in a state where the home screen is displayed. In this case, the touch screen 110 transmits the touch input signal to the controller 160 and the controller 160 may detect the long press on the touch screen. For example, the controller 160 may determine whether the touch is detected from the empty area where the icon 320 is not displayed and may determine whether the contact time exceeds a preset contact period.

When the touch does exceeds the preset contact period without any change of the position, the controller 160 may display the item list 340, which provides a number of function modes related to the home screen on the touch screen 110, as illustrated in a screen 302 in FIG. 3. The item list 340 of the function modes related to the home screen in the present invention may be overlapped or superimposed over the home screen. Alternatively the touch screen 110 may display the item list 340 of the function modes related to the home screen as a pop-up window on the home screen 310 under the control of the controller 160. The item list of the function modes may be a list for guiding an entry into a particular function mode which may be performed in the portable terminal in relation to the home screen 310. The item list 340 of the function modes in the present invention may provide functions for configuring the screen, such as, the icon movement and deletion item, the icon adding item, the folder creating item, the page adding item, the BACKGROUND SCREEN setting item, etc.

The user may touch or tab an icon corresponding to "movement and deletion item" 350 in order to enter into that particular function mode. Here, the controller 160 detects an input signal of the user who selects the icon movement and deletion item 350 and may change the operational mode of the terminal from the standby mode to an icon movement and deletion mode in response to the input signal of the user. Here, the touch screen may display an editing screen 360 to operate the icon movement and deletion mode under the control of the controller 160, as illustrated in a screen 303 in FIG. 3.

Meanwhile, the touch screen 110 may display that the operational mode is changed to the icon movement and deletion mode from the standby mode under the control of the controller 160. For example, the touch screen 110 may display the icon 320 on the home screen with a vibration animation effect while changing the color of the BACKGROUND SCREEN, and changing the screen layout under the control of the controller 160.

The touch screen 110 in an exemplary embodiment of the present invention may display a delete key 360 or a delete function icon in the editing screen in order to operate a movement and deletion mode, as illustrated in 303 in FIG. 3. Thus, the user may recognize that both the movement and deletion of the icon is possible.

The user may operate the touch screen 110 in order to move or delete the icon while the editing screen is being displayed. For example, the user may touch the touch screen 110 to select a specific icon to be moved. In response, the controller 160 may determine that the icon 320 selected by the user's touch as the object to be moved.

The controller 160 may detect the movement of the selected icon 320 and may move the selected icon 320 accordingly. The touch screen 110 may display the movement of the icon as a user drags the selected object under the control of the controller 160. The user may release the touch after moving the object to a desired location by the user 320. Accordingly, the selected icon 320 may be stationery on the home screen where the touch and drag motion is released, as illustrated in a screen 304 in FIG. 3.

In addition, the user may move the selected icon to a place where a delete key or a delete function icon is placed. The controller 160 may delete the selected icon from the home screen 310 when the touch is released after the selected icon moves to a place where the delete key or the delete functional icon is located.

Figure 4:
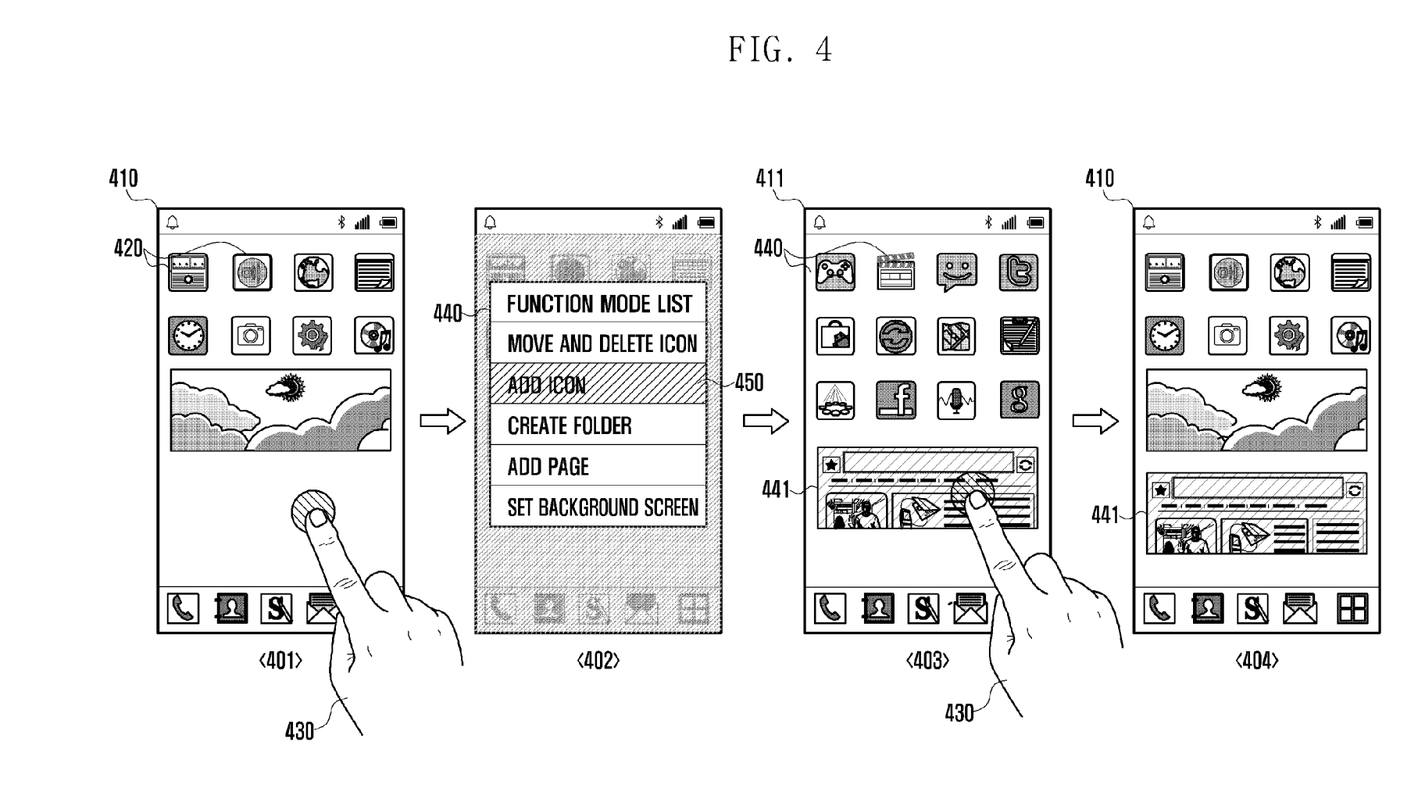
FIG. 4 is an example view illustrating a method of adding an object to configure a home screen according to an exemplary embodiment of the present invention.

FIG. 4 is an example view illustrating a method of adding an object to configure a home screen according to an exemplary embodiment of the present invention.

Referring to FIG. 4, the controller 160 may operate the standby mode in which the touch screen 110 may display the home screen including a plurality of objects under the control of the controller 160, as illustrated in a screen 401 of FIG. 4. Here, the object may include the icons 420 for executing functions and executing applications.

While the home screen is displayed, the user may long press 430 the touch screen 110 on the empty area where the icon 420 is not displayed. The controller 160 may detect the touch input from the empty and may determine whether the detected contact duration exceeds a preset contact period. When the touch exceeds the preset contact duration without any change, the controller 160 may display an item list 450 providing a number of function modes related to the home screen on the touch screen as illustrated in a screen 402 in FIG. 4. The item list 440 of the function mode related to the home screen in the present invention may be provided on the home screen in overlap form or as a pop-up window. The item list 440 of the functional list may be provided with functions to configure the screen, for example, the icon movement and deletion item, the icon adding item, the create folder item, the page adding item, and the BACKGROUND SCREEN setting item.

The user may select an icon adding item 450 in a state where the item list 440 of the function mode is displayed. The controller 160 detects the input signal of the user selecting the icon adding item 450 and may change the operational mode of the terminal to an icon adding mode. Here, the touch screen 110 may display an editing screen 411 under the control of the controller 160, as illustrated in a screen 403 in FIG. 4. Here, the touch screen 110 may provide objects 440 which are not displayed on the home screen of the editing screen 410 under the control of the controller 160. As other objects which are not displayed on the home screen 420 are displayed for selection, the user may recognize that the operational mode has changed to a mode for performing the icon adding function from the standby mode and then select the desired objection to be added on the home screen.

The user may operate the touch screen to add a specific icon on the home screen while the editing screen 411 is being displayed. For example, the user may touch the touch screen in order to select an icon to be added on the home screen. The controller 160 may determine an object 441 selected by the user's touch to be added to the home screen and may control to display the home screen 410 to which the determined object 411 is added, as illustrated in a screen 404 in FIG. 4.

According to the present invention, in the home screen, a list of function items of moving, deleting, and adding an object, creating a folder, adding a page, and setting a BACKGROUND SCREEN is displayed, and functions related to the home screen may be executed by selecting a function in the list of function items. Therefore, instead of distinguishing interactions for each editing function, switching into a screen configuration mode to conveniently add or delete the home screen by an easier interaction is possible.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of configuring a home screen in a terminal having a touch screen, the method comprising:
   displaying the home screen including one or more objects on the touch screen;
   detecting a first touch gesture requesting a display of a list of selectable function modes related to the home screen;
   displaying the list of selectable function modes in response to the first touch gesture including at least an object movement and deletion item, and an item addition item, such that the home screen including the one or more objects is dimmed for display, and the list is disposed overlaying the dimmed home screen;
   detecting a second touch gesture selecting a particular function mode; and
   changing an operation mode of the terminal from a standby mode into the selected function mode in response to the second touch gesture, the selected function mode corresponding to an editing screen on the touch screen,
   wherein when the item addition item is selected, the home screen including the dimmed one of more objects is removed from display to display a plurality of icons addable to the home screen, and
   wherein the first touch gesture is detected in the home screen other than an area displaying the one or more objects.

2. The method of claim 1, wherein the detecting the first touch gesture comprises:
   detecting a touch input on an empty area of the home screen; and
   determining whether the touch input exceeds a preset time.

3. The method of claim 2, when the touch input exceeds the preset time, displaying the list of selectable function modes.

4. The method of claim 1, wherein the list of selectable function modes comprises a page adding item in addition to at least one of a folder creating item and a background screen setting item.

5. The method of claim 1, wherein the list of selectable function modes is displayed in form of a pop up window, the pop up window overlaying at least a portion of a first row of the one or more objects, and overlaying a totality of at least one object of a second row of the one or more objects such that the at least one object is not displayed.

6. The method of claim 1, wherein when the object movement and deletion item is selected in response to the second touch gesture, the editing screen displays objects that are not displayed on the home screen including a delete icon disposed away from any of the one or more objects, wherein movement of a particular object of the one or more objects to the delete icon causes deletion of the particular object.

7. The method of claim 1, further comprising:
in response to detecting selection of one of the plurality of icons addable to the home screen, removing the plurality of icons from display and redisplaying the home-screen including the selected one of the plurality of icons.

8. The method of claim 1, wherein, when the object movement and deletion item is selected in response to the second touch gesture, the editing screen displays objects that are not displayed on the home screen including a delete icon disposed away from any of the one or more objects, wherein movement of a particular object of the one or more objects to the delete icon causes deletion of the particular object.

9. A portable terminal comprising:
a touch screen; and
at least one processor configured to:
control the touch screen to display a home screen including one or more objects on the touch screen,
detect a first touch gesture requesting a display of a list of selectable function modes related to the home screen,
display the list of the selectable function modes in response to the first touch gesture including at least an object movement and deletion item, and an item addition item, such that the home screen including the one or more objects is dimmed for display, and the list is disposed overlaying the dimmed home screen,
detect a second touch gesture selecting a particular function mode, and
change an operation mode of the terminal from a standby mode into the selected function mode in response to the second touch gesture and display an editing screen on the touch screen in response to the changed operation,
wherein when the item addition item is selected, the home screen including the dimmed one or more objects is removed from display to display a plurality of icons addable to the home screen, and
wherein the first touch gesture is detected in the home screen other than an area displaying the one or more objects.

10. The portable terminal of claim 9, wherein the at least one processor controls the touch screen to display the list of selectable function modes to be superimposed on the home screen.

11. The portable terminal of claim 9, wherein the at least one processor controls the touch screen to display the list of selectable function modes is displayed in form of a pop up window, the pop up window overlaying at least a portion of a first row of the one or more objects, and overlaying a totality of at least one object of a second row of the one or more objects such that the at least one object is not displayed.

12. The portable terminal of claim 9, wherein the at least one processor controls the touch screen to display the list of selectable function modes including a page adding item in addition to at least one of a folder creating item and a background screen setting item.

13. The portable terminal of claim 9, wherein when a delete function item of the object is selected in response to the second touch gesture, the at least one processor controls the editing screen to display other objects not displayed on the home screen including a delete icon disposed away from any of the one or more objects, wherein movement of a particular object of the one or more objects to the delete icon causes deletion of the particular object.

14. The portable terminal of claim 9, the at least one processor further configured to:
in response to detecting selection of one of the plurality of icons addable to the home screen, remove the plurality of icons from display and redisplaying the homescreen including the selected one of the plurality of icons.

15. The portable terminal of claim 9, wherein, when a delete function item of the object is selected in response to the second touch gesture, the at least one processor controls the editing screen to display other objects not displayed on the home screen including a delete icon disposed away from any of the one or more objects, wherein movement of a particular object of the one or more objects to the delete icon causes deletion of the particular object.

* * * * *